THOMAS J. MAYALL.
Improvement in Machinery for Making India Rubber Hose or Tubing.
No. 125,598.     Patented April 9, 1872.
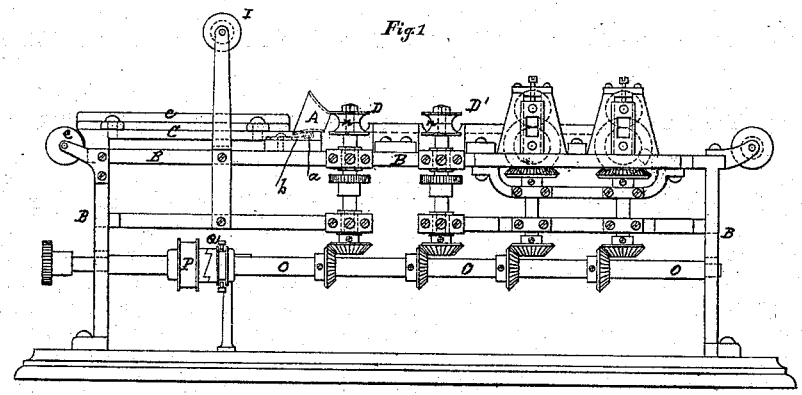
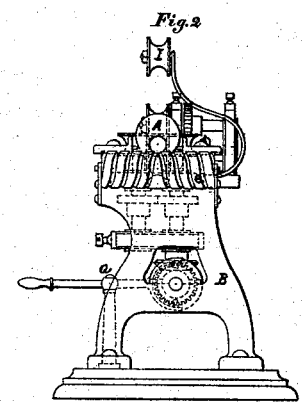
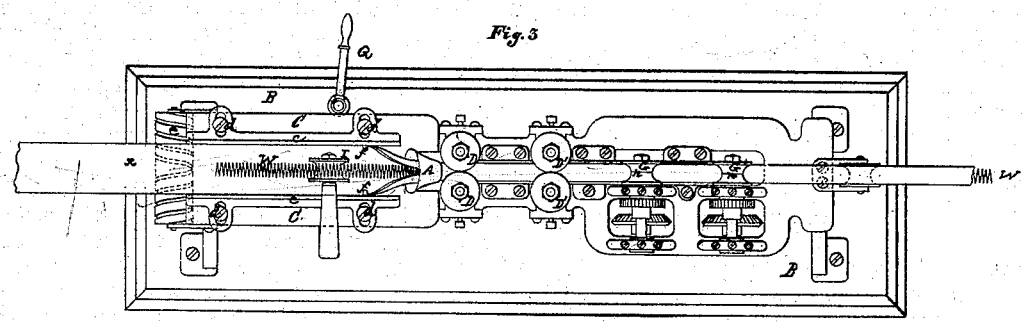
Witnesses:
C. B. Nottingham
J. R. Nottingham
Inventor:
Thos. J. Mayall
by atty A. Pollok

UNITED STATES PATENT OFFICE.

THOMAS J. MAYALL, OF BOSTON, MASSACHUSETTS.

IMPROVEMENT IN MACHINERY FOR MAKING INDIA-RUBBER HOSE AND TUBING.

Specification forming part of Letters Patent No. 125,598, dated April 9, 1872.

*To whom it may concern:*

Be it known that I, THOS. J. MAYALL, of Boston, Suffolk county, Massachusetts, have invented certain new and useful Improvements in Machinery for the Manufacture of India-Rubber Tubing or Hose, of which the following is a specification:

My invention relates to machinery for shaping strips, bands, or ribbons of vulcanizable India-rubber compound into tubing or hose, prior to the vulcanization of the same. The principal feature of the machinery consists of a funnel or hollow trumpet-shaped or tapering former, in its passage through which the rubber band or strip is brought to the form of a tube.

In connection with this device I use drawing-rolls, for the purpose of drawing the tubing through and out of the funnel, and also for more perfectly forming the tubing and uniting together the edges of the strip or band from which it is made. The tube-forming funnel may, however, be used alone, the tubing being drawn through it by hand; or any suitable mechanical means for effecting the movement of the rubber strip through the funnel may be employed.

I have represented in the accompanying drawing an arrangement of machinery which I find well adapted for the purpose of carrying my invention into effect.

Figure 1 is a side elevation of the machine; Fig. 2 is a front elevation, and Fig. 3 is a plan of the same.

The tube-forming funnel is shown at A. It may be of any length desired, tapering gradually from the end where the band enters to the end from which the funnel-tube emerges, the diameter of the funnel at this latter end being such as is required for the tubing. Owing to this form of the tube-forming device, the rubber strip, as it passes through it, has its longer edges bent over gradually toward each other until they meet and are pressed together, so that it emerges from the smaller end of the funnel in the shape of tubing. In order to adjust the funnel to cause it to join effectually together the two edges of the rubber and to make a tight seam, it is hinged at $a$, so that it may, when required, be tilted up or down upon that point as an axis. And for the purpose of adjusting it with reference to the drawing-rolls or other tube-drawing devices, it is mounted upon a foot or support, $b$, which rests upon the bench or table to which the funnel is applied, and is held thereto by means of a set-screw passing into the table through a longitudinal slot in said support, whereby the latter, together with the funnel which it carries, may be adjusted nearer to or further from said drawing devices. In the present instance, the tube-forming funnel rests upon the bed of a frame, B, which supports all the machinery. In front of the funnel is the table C, over which the rubber strip $x$ passes to said funnel. The strip travels between sliding guide-pieces $c$, which may be adjusted at various distances apart, in accordance with the width of the strip betweeen them, and then held in such position by means of the set-screws $d$ passing down into the table C through slots formed in ears projecting laterally from said guide-pieces, as shown in Fig. 3. In front of the table C is a divergingly-grooved roller, $e$, which serves to keep the rubber properly spread. A little in advance of the funnel are horizontal fingers $f$, under which the strip passes, whose function is to keep the rubber strip flat and spread out, and to prevent the edges from rising and bending toward each other until they pass said fingers.

Beyond the smaller end of the funnel are arranged the tube-drawing devices. They consist, in this instance, of two pairs of rollers, D D', revolving on vertical axes, and two pairs of rollers, G G', revolving upon horizontal axes. These rollers have concave grooves formed in their peripheries, so that they may fit around the tube which passes between them, and each roller is divided into two parts, the line of division being indicated at $n$, so that washers may be interposed between the two parts when it is required to increase the size of the rollers for tubing of larger size. The two parts of each roller, when put together, are clamped by a nut screwing down upon the spindle on which they are mounted. Another object in thus forming the rollers is to allow of the removal at any time from between them of the tubing, this being accomplished by unscrewing their holding-nuts and drawing off the halves or parts of the rollers nearest the outer end of the roller spindles. Between the different pairs of rollers troughs are placed for conducting the tubing from one set to the other. The rollers being arranged, some on vertical and some on horizontal axes, press upon all sides of the tubing, and not only draw it along, but compress the seam, and shape and complete the tubing. The rollers are arranged in sliding-boxes, so that they may be adjusted nearer to or further from each other. The rollers of each pair are geared together, and all receive motion from a common driving-shaft, O, by means of a gear on the elongated shaft of one roller of each pair, engaging with gearing on said shaft O, as shown plainly in the drawing. The shaft is provided with the usual loose driving-pulley P, and clutch mechanism Q for connecting said pulley with and disconnecting it from the shaft. The drawing-rollers should have surfaces adapted to take a hold on the tubing, and for this purpose I prefer to cover them with a band of vulcanized rubber, though other means may be employed, if desired.

The rubber, when it passes through the machine, is, of course, in the green or plastic state. When made into tubing, and after it passes from the machine, it is vulcanized and finished in the usual way.

In order to cause the edges of the rubber band to adhere together, I moisten them with camphene, naphtha, or other solvent, or with a solution of rubber or rubber cement. This is usually effected by causing the edges of the rubber, before arriving at the machine, to pass between wicking or strips of cloth kept saturated with the solution or solvent.

The machine described is well adapted, not only for the manufacture of ordinary rubber tubing, but for wire-lined rubber tubing. The spirally-coiled wire W can be fed into the funnel over a roller, I, where it will be surrounded by the rubber strip, as shown in Fig. 3.

Having now described my invention, and the manner in which the same is or may be carried into effect, what I claim and desire to secure by Letters Patent, is—

1. A machine for manufacturing India-rubber tubing or hose, organized and operating substantially as herein shown and set forth.

2. The employment, in the manufacture of India-rubber hose or tubing, of a tube-forming funnel or tapering hollow tube, in its passage through which the prepared band or strip of rubber compound is gradually brought from its original shape to the form of tubing or hose, substantially as shown and set forth.

3. The combination, with the tube-forming funnel, of the table and adjustable guides, by means of which the prepared rubber strip is directed to the funnel, substantially as shown and set forth.

4. In combination with the tube-forming funnel, the concave-grooved drawing-rollers, or equivalent devices, for drawing the tubing through and out from the funnel, substantially as and for the purposes set forth.

5. In machinery, substantially such as described, the arrangement of the grooved drawing-rollers in pairs, a part on vertical and a part on horizontal axes, substantially as and for the purposes set forth.

6. In machinery, such as described, the employment of concave drawing-rollers, each divided into two parts, substantially as and for the purposes shown and described.

In testimony whereof I have signed my name to this specification before two subscribing witnesses.

THOS. J. MAYALL.

Witnesses:
 EDM. F. BROWN,
 A. POLLOK.